United States Patent
Markovitz et al.

(10) Patent No.: US 7,311,971 B2
(45) Date of Patent: Dec. 25, 2007

(54) ONE PART, HEAT CURED PRESSURE SENSITIVE ADHESIVES

(75) Inventors: Mark Markovitz, Schenectady, NY (US); William Gene Newman, Scotia, NY (US); Mabel Shang Yung, Clifton Park, NY (US); Leonard Paul Squillacioti, Saratoga Springs, NY (US); Peter John Foley, Scotia, NY (US)

(73) Assignee: General Electric Company, Schenectady, NY (US)

( * ) Notice: Subject to any disclaimer, the term of this patent is extended or adjusted under 35 U.S.C. 154(b) by 437 days.

(21) Appl. No.: 10/909,288

(22) Filed: Aug. 3, 2004

(65) Prior Publication Data

US 2006/0029810 A1 Feb. 9, 2006

(51) Int. Cl.
*B32B 27/38* (2006.01)
*C08L 63/00* (2006.01)

(52) U.S. Cl. .................................. 428/413; 424/474.4
(58) Field of Classification Search ................ 428/413
See application file for complete search history.

(56) References Cited

U.S. PATENT DOCUMENTS

| 4,617,348 | A | * | 10/1986 | Dickie et al. ............... 525/112 |
| 4,652,218 | A | | 3/1987 | Tsutsui et al. |
| 4,980,234 | A | * | 12/1990 | Almer et al. ................ 428/414 |
| 5,071,914 | A | * | 12/1991 | Zimmel et al. .............. 525/113 |
| 5,128,569 | A | | 7/1992 | Gladish |
| 5,340,946 | A | * | 8/1994 | Friedrich et al. ........... 174/256 |
| 5,416,373 | A | | 5/1995 | Maruyama et al. |
| 5,712,039 | A | * | 1/1998 | Marhevka et al. .......... 428/414 |
| 6,656,979 | B1 | * | 12/2003 | Kitano et al. ................ 522/100 |
| 6,686,425 | B2 | * | 2/2004 | Wigdorski et al. ........ 525/326.9 |
| 6,767,980 | B2 | * | 7/2004 | Yurugi et al. ................ 526/320 |

\* cited by examiner

*Primary Examiner*—Randy Gulakowski
*Assistant Examiner*—John J. Figueroa
(74) *Attorney, Agent, or Firm*—Nixon & Vanderhye P.C.

(57) ABSTRACT

Novel one part, heat cured pressure-sensitive adhesives capable of bonding metallic and non-metallic materials at ambient temperatures and curing at elevated temperatures to form a bond with very high adhesive bond strengths at temperatures up to at least 160° C. The invention is particularly well suited for use with insulated copper coils in electrical generators and includes both the adhesive compositions per se and adhesive transfer tapes capable of bonding to the copper coils at ambient temperatures upon contact due to the pressure sensitive tack of the adhesive. The transfer tapes can subsequently be cured to a hard, thermoset adhesive with high adhesive bond strength. In applications on insulated copper coils, exemplary one part, heat cured pressure-sensitive adhesives can be used either alone or in combination with a substrate to form single or double-sided adhesive tape capable of securing the generator rotor turn insulation. The pressure sensitive materials can also be applied to a mat carrier, such as aramid paper, polyester glass, or glass cloth based epoxy sheets.

19 Claims, 2 Drawing Sheets

ONE PART, HEAT CURED PRESSURE SENSITIVE ADHESIVES

Figure 1:
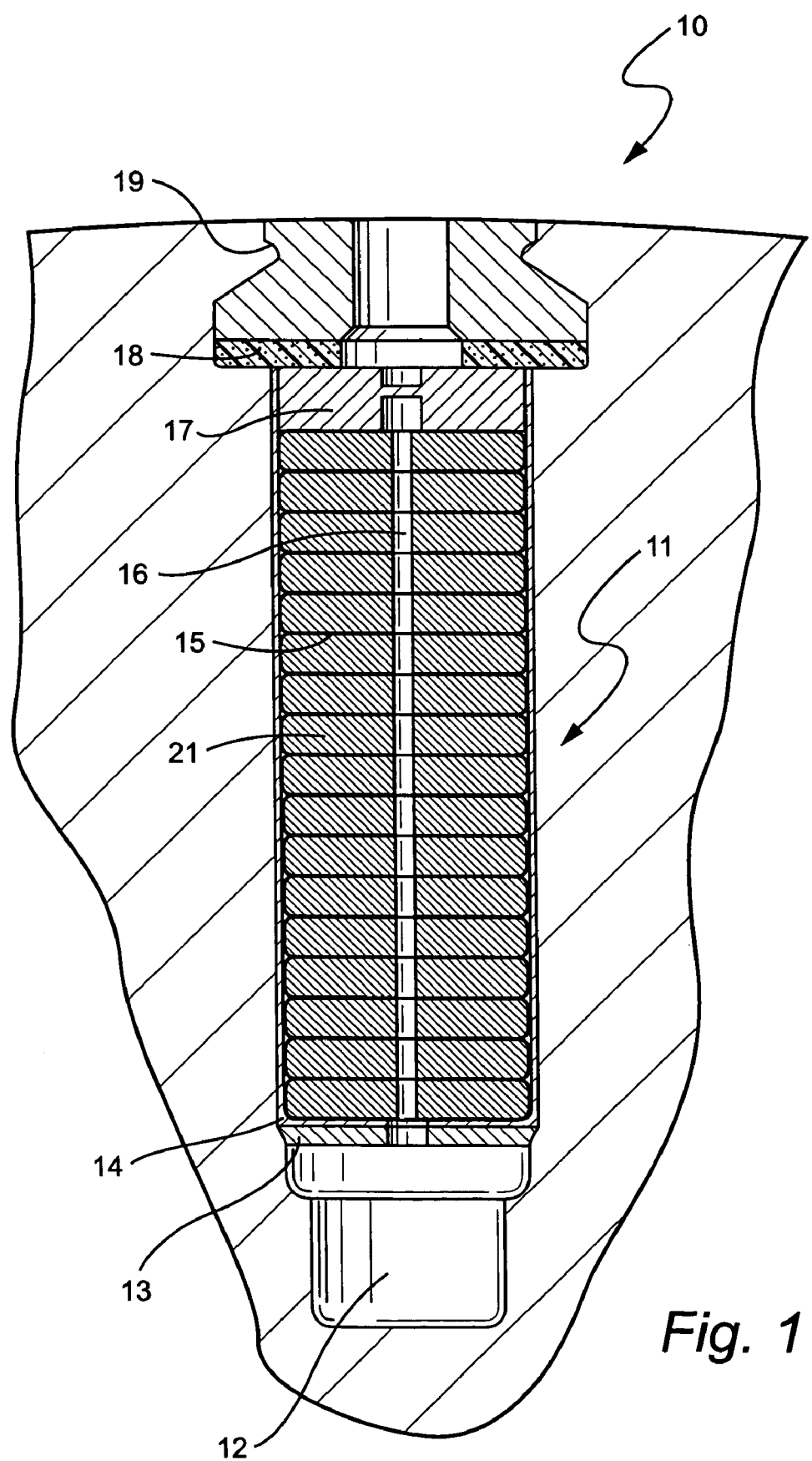

The present invention relates to one part, heat cured pressure-sensitive adhesives that bond metallic and non-metallic materials at ambient temperatures and cure at elevated temperatures to form a tenacious bond with high adhesive bond strengths at temperatures up to at least 160° C. The present invention also relates to adhesive transfer tapes that include adhesives according to the invention. The adhesive tape bonds immediately on contact at ambient temperatures due to the tack of the pressure sensitive adhesive which can then be cured to a hard, thermoset adhesive with high adhesive bond strength at room temperatures up to at least 160° C.

The present invention also relates to improvements in insulated copper coils used in electrical generators and, in particular, to the use of one part, heat cured pressure-sensitive adhesives, either alone or in combination with a substrate, to form single or double-sided adhesive tapes capable of securing generator rotor turn insulation. In one aspect of the invention, the pressure sensitive adhesives according to the invention can be applied to a mat carrier, such as aramid paper, polyester glass, or glass cloth based epoxy sheets.

BACKGROUND OF THE INVENTION

Copper coil turns in generator fields are insulated from each other by electrical insulating sheet like materials or heat resistant calendered papers. Typically, the sheet materials include a cured polyester woven glass cloth or a cured epoxy woven glass cloth material or NOMEX™ (insulating material) aramid paper that has been densified by calendering. Dielectric films with high glass transition temperatures may also be used. The insulating materials are normally coated on one side with a thin adhesive film, typically an epoxy adhesive, that cures when subjected to heat and pressure to bond the insulating sheet material to the copper.

There are several problems with this known process. First, the adhesive on the woven glass cloth sheet material or the aramid paper consists of a dry, thin coating that has virtually no adhesion or "grab" to the copper coil turns during manufacture or assembly of the generator field. As a result, heretofore, it was necessary to use a strip of adhesive transfer tape to hold the insulation in place during the field assembly. However, conventional adhesive transfer tapes do not cure during bake (causing the adhesive in the tape to solidify). The transfer tape thus becomes a permanent constituent of the field coil insulation adhesive system. During operation of the generator, the heat created by the generator weakens the bond of the transfer tape adhesive to the copper and can lead to slipping of the insulation or even eventual shorting of the coil turns resulting in reduced generator performance, or generator failure.

Another known problem with prior art insulating materials is that epoxy adhesives on sheet materials or aramid paper normally require very high cure temperatures and the large mass of steel and copper in the generator field must be heated to cure the adhesives. Because of the large mass, it can take excessive time to reach the required cure temperature for the adhesives.

Still another problem has been that the electrical insulating sheet-like materials or heat resistant calendered papers must be pre-coated with the adhesive. Depending on the design and rating of the generator, the specified width and thickness of the insulating material can change, resulting in the need to carry a large inventory of adhesive coated insulating materials. Although most adhesives have a relatively long, but finite shelf life, significant costs can be incurred due to having to discard insulating materials that reach the end of their useful shelf life before they can be used.

In addition, the manual application of adhesive to the insulation prior to assembly has always been labor intensive, resulting in unintended and unwanted bonding of surfaces that move relative to one another during operation of the generator. Further, in the past a waiting period was often required to allow solvent to evaporate or to allow the adhesive to partially cure to make it more "tacky" before proceeding with installation of the next piece of insulation. Thus, the assembly time for systems using conventional adhesives could be quite long.

More recently, a commercial Nomex™ aramid paper based tape has been used that includes a thermosetting synthetic resin adhesive. This product has the advantage of being pressure sensitive at ambient temperatures to secure the insulation to the copper at ambient temperatures. However, the required cure temperature was at least one hour at 150° C. or two hours at 130° C. In addition, although this material exhibited good adhesion at room temperature, the bond strength dropped precipitously at about 80° C. with little or no bond strength at higher temperatures. There was also no discernible improvement in bond strength at elevated temperatures when the cure time or cure temperature was increased. These deficiencies made the Nomex™ type of tape unacceptable for use in generator fields.

Another advance in copper bonding technology involved the application of a heat curable adhesive material to one surface of the insulation. However, the adhesives had to be heated by baking the field to relatively high temperatures to achieve the desired bond strength. Such systems normally required cure temperatures from 130° C. to 160° C. and bake times from 10 to 12 hours. Although some thermoset adhesives were developed with lower cure temperatures, none cured at or below about 100° C., i.e., low enough to benefit manufacturing. The adhesives were also tack-free on the surface and thus required a pressure sensitive transfer tape to hold the insulation in place during assembly. Since the pressure sensitive transfer tape could not be removed from the turns at the conclusion of the assembly process and the tape does not cure to a thermoset solid during bake, it remained a significant weak point in the bonding of the insulation to the copper turns.

Thus, a significant need still exists for a resin composition that enables the manufacturing of insulating films, sheet materials and calendered aramid papers with a thin coating of a pressure sensitive adhesive that bonds at ambient temperatures. A need also exists for a pressure sensitive adhesive capable of curing at elevated temperatures to a thermoset solid with good adhesive bond strength at operating temperatures up to at least 160° C.

BRIEF DESCRIPTION OF THE INVENTION

The present invention provides a new type of heat cured, pressure-sensitive adhesive and related transfer tape capable of bonding sheet, densified paper or film insulating materials to copper instantly on contact at ambient temperatures. The transfer tape adhesive also cures at elevated temperatures to a thermoset solid with good adhesive bond strength at temperatures up to at least 160° C. The shelf life of both the adhesive and transfer tape according to the invention is six months or greater at ambient temperatures of between 50 and 95° F. In addition, the elevated cure temperatures of the new transfer tape adhesives range from 90 to 110° C., although higher temperatures can be used to accelerate the cure. Thus, uncoated sheet, film and calendered paper insulating materials can be used to insulate copper turns with the transfer tape adhesive as the sole adhesive being bonded to the copper, thereby eliminating the need to maintain a large inventory of materials with limited shelf lives.

It has now been found that the requirements of the adhesive in the transfer tape can be met by using a combination of a liquid epoxy resin having an epoxide functionality of at least 2.0, a high molecular weight linear polyether copolymer of epichlorohydrin and bisphenol A, micropulverized dicyandiamide and an accelerator. A woven or non-woven fabric carrier can be used for the adhesive in the transfer tape, although the transfer tape can be manufactured without a carrier.

In one embodiment, the adhesives according to the invention comprise a combination of a liquid epoxy resin having an epoxide functionality of at least 2.0, a high molecular weight linear polyether copolymer of epichlorohydrin and bisphenol A, micropulverized dicyandiamide and accelerator. By using the new adhesive compositions described below, the manufacture of high performance electrical insulation for copper coil turns in generator fields becomes faster and much more reliable.

Liquid epoxy resins having an epoxide functionality of at least 2.0 form the main component in the adhesive. The high molecular weight linear polyether copolymer consisting of epichlorohydrin and bisphenol A is soluble in the epoxy resin and acts as a tackifier for the adhesive to provide adhesion at ambient temperatures. The dicyandiamide and accelerator are dispersed in the solution containing the epoxy resin and the polyether copolymer to provide shelf life stability of at least six months at temperatures between 50 and 95° F. Those components dissolve rapidly in the resin beginning at about 90° C., resulting in much faster curing to a thermoset solid while maintaining excellent adhesive properties up to at least 160° C. Colorants such as dyes or pigments may also be added to make the adhesive more visible on the film, sheet material or calendered aramid paper. Inorganic fillers such as submicron pyrogenic silica may also be used to control the flow properties of the adhesive onto the substrate.

As noted above, the new adhesives according to the invention have excellent shelf life stability at ambient temperatures, thereby allowing pre-coating of a wide variety of insulating materials, such as Nomex™ aramid paper, polyester-woven glass cloth and epoxy-woven glass cloth sheet materials; and dielectric films such as polyethylene terephthalate (PET polyester), polyethylene naphthalate (PEN polyester), polyimide films such as Kapton™, polyphenylene sulfide (PPS), polyetherimide (PEI), polyethersulfone (PES) and polyetheretherketone (PEEK).

The transfer tape also retains its desirable pressure sensitive adhesive properties for at least 6 months at ambient temperatures and still cures to a thermoset solid when heated to 90° C. or above. Thus, a high strength bond is formed on contact at ambient temperatures and a permanent, thermoset bond forms when heated at temperatures as low as 90° C.

Other objects and advantages of this invention will be better appreciated from the following detailed description.

DETAILED DESCRIPTION OF THE INVENTION

Referring to FIG. 1, a cross-section of a generator rotor slot 10 illustrates the components used in a typical rotor assembly. Slot 10 is machined from the rotor forging 11 and contains sub-slot 12 which provides a ventilation path in the rotor forging 11. The sub-slot cover assembly 13 provides support for the slot components. The slot armor 14 serves as the ground insulation between the copper 21 and the rotor forging 11. The copper turns 21 comprise the current carrying component of the generator to provide magnetic flux. Insulation 15 provides electrical insulation between the turns. The turn insulation 15 is shown in more detail in FIGS. 2 and 3 and consists of an insulating sheet material 23 and an adhesive 22 on one side of the sheet material 23 bonded to the turn copper 21. The rotor duct 16 provides a path for ventilation gases to flow from the sub-slot 12 to the copper 21 and out into the stator gap. The creepage block 17 provides mechanical support and electrical separation between copper 21 and wedge 19. An electrical insulating slot filler material 18 may also be present between the creepage block 17 and the wedge 19.

Figure 2:
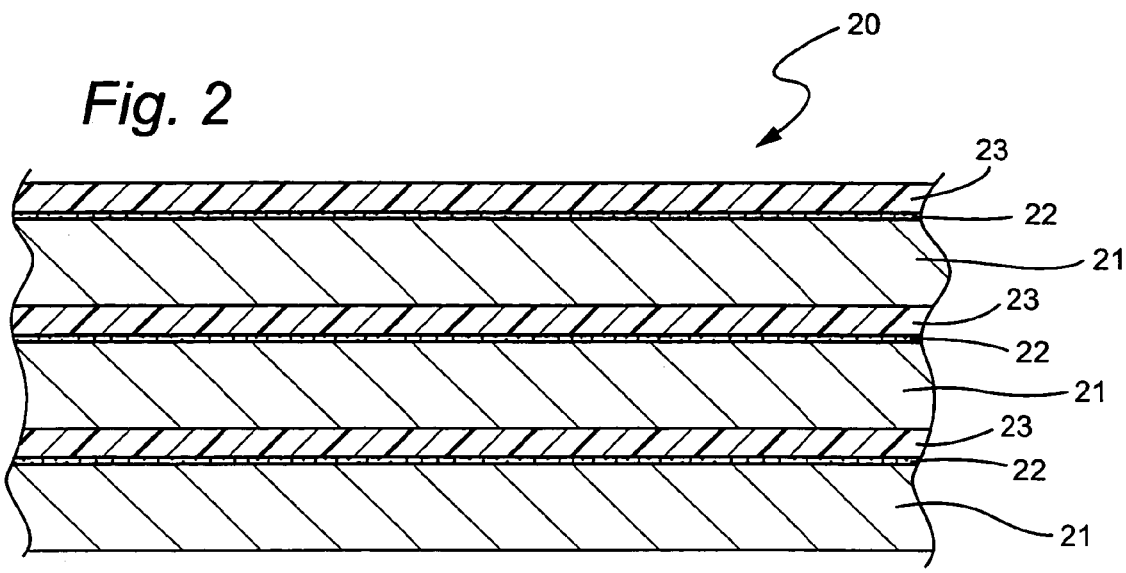

As illustrated in FIG. 2, a section of three copper coil turns 20 are insulated from each other and can move relative to each other. In each turn, the turn copper 21 is bonded on one side to insulating sheet material 23 (or calendered aramid paper or film) containing adhesive 22 according to the present invention. As discussed above, the adhesive can be pre-applied as a thin coating 22 on a roll of the insulating material 23.

Figure 3:
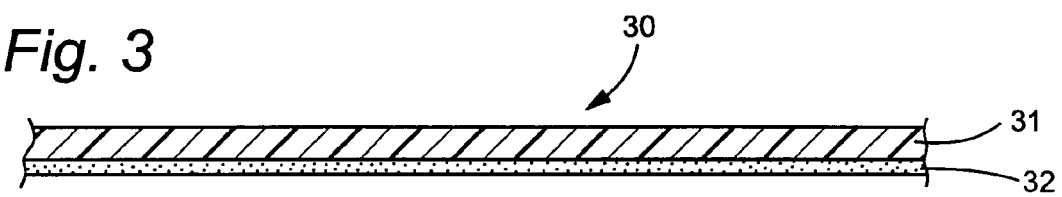

FIG. 3 shows the insulating material 30 prior to being used in the assembly. In this case, the adhesive has been pre-applied as a thin coating 22 on the roll of the insulating material 23. A release liner 31 is attached to the adhesive coated side 22 of the insulating material 23 to prevent the rolls from blocking. The rolls are then slit to the required width for the turn copper in the generator field. During field assembly, the release liner 31 is peeled off and discarded. The insulating material 23 containing adhesive 22 is then pressed against the turn copper and adhesively bonds to the copper. If adjustment of the insulation is necessary, it can be peeled off from the copper and re-bonded without loss of adhesive performance.

Figure 4:
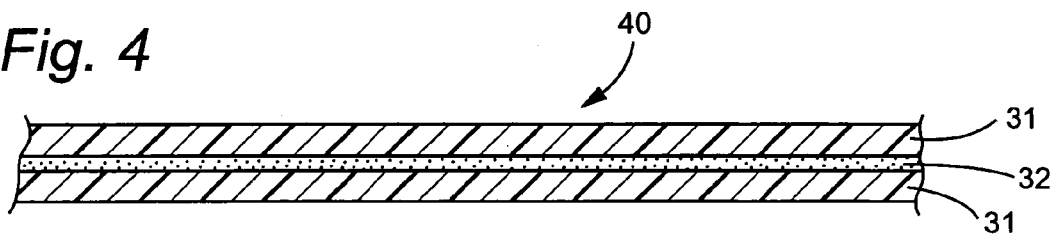

FIG. 4 illustrates a transfer tape 40 in which adhesive 32 according to the invention has been applied initially to release liner 31. A second release liner 31 is wedded to the adhesive 32 and can include a release coating, usually a silicone, either on both sides or on the side facing adhesive 32. Again, during field assembly, a piece of adhesive transfer tape 40 is cut to the required length and one release liner 31 is pulled off and discarded. The remaining piece is then pressed against the copper or the insulating material, and release liner 31 is peeled off leaving adhesive 32 on the copper or the insulating material.

Figure 5:
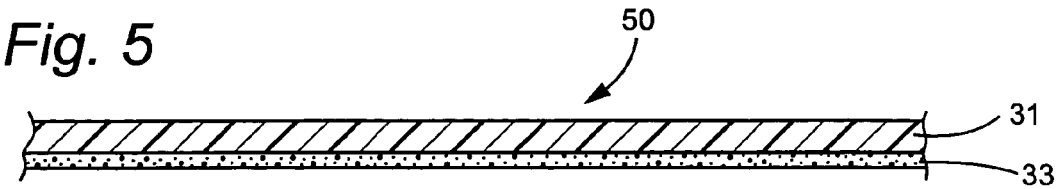

FIG. 5 illustrates a transfer tape 50 with adhesive 33 according to the invention carried by a woven or non-woven fabric on a release liner 31 having a release coating (usually a silicone) on both sides. The release coating makes it possible to manufacture rolls of the adhesive transfer tape 50 without "blocking," i.e., bonding to itself.

Figure 6:
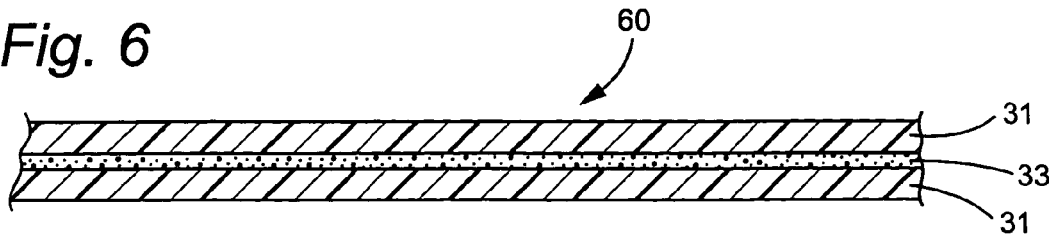

FIG. 6 depicts a transfer tape 60 with adhesive 33 carried by a woven or non-woven fabric on a release liner 31 on both sides of adhesive 33. Adhesive 33 was first applied on one release liner 31. Second release liner 31 was then wedded to the adhesive 33. As noted above, the release liner 31 can include a release coating, usually a silicone, on both sides or on the side facing the adhesive 33. As in the embodiments of FIGS. 4 and 5, during field assembly a piece from a roll of adhesive transfer tape 60 is cut to the required length, release liner 31 is pulled off and discarded, and the remaining piece is then pressed against the copper or the insulating material. The remaining release liner is peeled off and discarded, leaving adhesive 33.

As noted above, the main component in adhesives according to the present invention is the liquid epoxy resin having an epoxide functionality of at least 2.0. Examples of such epoxy resins include bisphenol A—diglycidyl ether epoxy resins such as EPON™ 825, epoxide equivalent weight 172 178, viscosity 4,000 6,000 centipoises @ 25° C.; DER™ 332, epoxide equivalent weight 172 176, viscosity 4,000 6,000 centipoises @ 25° C.; ARALDITE™ 6004, epoxide equivalent weight 179 minimum, viscosity 5,000 6,000 centipoises @ 25° C. Other useful, higher viscosity, bisphenol A—diglycidyl ether epoxy resins include EPON™ 826, epoxide equivalent weight 178 186, viscosity 6,500 9,500 centipoises @ 25° C.; DER™ 330, epoxide equivalent weight 177 188, viscosity 7,000 10,000 centipoises @ 25° C. and ARALDITE™ 6005, epoxide equivalent weight 182 189, viscosity 7,000 10,000 centipoises @ 25° C.

Additional higher viscosity resins useful in the invention include EPON™ 828, epoxide equivalent weight 185 192, viscosity 11,000 15,000 centipoises @ 25° C.; DER™ 331, epoxide equivalent weight 182 190, viscosity 11,000 14,000 centipoises @ 25° C. and ARALDITE™ 6010, epoxide equivalent weight 182 196, viscosity 12,000 16,000 centipoises @ 25° C. Still higher viscosity bisphenol A—diglycidyl ether epoxy resins include EPON™ 830, epoxide equivalent weight 190 198, viscosity 17,000 22,500 centipoises @ 25° C.; DER™ 317 epoxide equivalent weight 192 203, viscosity 16,000 25,000 centipoises @ 25° C. and ARALDITE™ 6020, epoxide equivalent weight 192 208, viscosity 16,000 20,000 centipoises @ 25° C.

A bisphenol F—diglycidyl ether epoxy resin can be used in place of a bisphenol A—diglycidyl ether epoxy resin, for example EPON™ DPL 862 having an epoxide functionality of 2.0, epoxide equivalent weight 166 177, and viscosity 3,000 4,000 centipoises @ 25° C. Other examples of bisphenol F—diglycidyl ether epoxy resins useful in the invention having an epoxide functionality of 2.0 include ARALDITE™ GY282, epoxide equivalent weight 167 175, viscosity 3,000 4,000 centipoises @ 25° C. and ARALDITE™ GY285, epoxide equivalent weight 164 173, viscosity 2,000 3,000 centipoises @ 25° C. An epoxy novolac, such as DEN™ 431 having a 2.2 epoxide functionality, epoxide equivalent weight 172 179 and viscosity 1,400 2,000 centipoises @ 52° C. can also be used, if desired.

It has also been found that blends of two or more epoxy resins can be used for some applications. That is, the epoxy resins can be diluted with reactive diluents having an epoxide functionality of at least 1.0. Preferably, the epoxy resin or blend of epoxy resins remain a liquid at ambient temperatures for ease of application to the substrate.

For every 100.0 parts by weight of epoxy resin (or a blend of two or more epoxy resins), at least 2.5 parts by weight (based on solids to solids) to about 25.0 parts by weight (based on solids to solids) of a high molecular weight linear polyether copolymer of bisphenol A and epichlorohydrin are used. Examples of acceptable linear polyether copolymers include EPONOL™ 53 L 32, 32% solids in cellosolve acetate, Gardner Holdt viscosity Z Z5 at 25° C.; EPONOL™ 55 L 32, 32% solids in cellosolve acetate, Gardner Holdt viscosity Z4 Z8 at 25° C.; EPONOL™ 53 BH 35, 35% solids in methyl ethyl ketone/propylene glycol monomethyl ether 75:25, Gardner Holdt viscosity U Z2 at 25° C.; and EPONOL™ 55 BH 30, 30% solids in methyl ethyl ketone/propylene glycol monomethyl ether 75:25, Gardner Holdt viscosity W Z at 25° C. Similar or equivalent linear polyether copolymers are available from other manufacturers.

Exemplary curing agents for the epoxy resin used in the invention include dicyandiamide, preferably micropulverized dicyandiamide where 98% is less than 10 microns and contains an anticaking agent.

Accelerator compounds useful with the epoxy-dicyandiamide include:

3-phenyl-1,1-dimethylurea 3-(4-chlorophenyl)-1,1-dimethylurea 3-(3,4-dichlorophenyl)-1,1-dimethylurea or 3-(3-chloro-4-methylphenyl)-1,1-dimethylurea.

Other acceptable accelerators for use with the dicyandiamide include imidazoles, amines and complexes of amines or imidazoles with acidic compounds.

Representative insulating materials that can be used between copper turns in generator fields are listed below.

(1) Calendered NOMEX™ a high temperature resistant aramid paper densified by hot calendering after sheet formation having a nominal thickness of 0.005 to 0.020 inch and a minimum dielectric strength of 550 volts/mil.

(2) CONOLITE™ a cured, woven glass cloth sheet material impregnated with a polyester resin and ranging in thickness from about 0.005 to 0.062 inch and resistant to thickness change when pressed at high pressures and elevated temperatures.

(3) ACME™ glass a cured, woven glass cloth sheet material impregnated with an epoxy resin and with a thickness ranging from 0.0055 to 0.0105 inch and resistant to thickness change when pressed at high pressures and elevated temperatures.

(4) Dielectric films having a high glass transition temperature, including, for example, polyethylene terephthalate (PET polyester), polyethylene naphthalate (PEN polyester), polyimide films such as KAPTON™, polyphenylene sulfide (PPS), polyetherimide (PEI), polyethersulfone (PES) and polyetheretherketone (PEEK).

As shown in FIGS. 3 and 4, adhesive compositions according to the invention can be used alone or, as shown in FIGS. 5 and 6, applied onto a woven or non woven fabric carrier. Examples of fabric carriers include but are not limited to: REEMAY™ non woven spunbonded polyester fabric with thicknesses from about 5 to about 21 mils; polyester non woven mat fabrics such as DACRON™ that are calendered non woven polyester mats with thicknesses as low as 0.8 mil to 2 mils or higher; porous aramid non woven fabrics with a basis weight of 0.4 to 1.0 ounce per square yard or higher; and plain weave glass fabrics ranging from a thickness of about 1.5 mils and a basis weight of about 0.73 ounce per square yard to a thickness of about 10 mils and a basis weight of about 7.0 ounce per square yard.

Those skilled in the art will gain a better understanding of the present invention and its advantageous properties and characteristics as compared to conventional, prior art adhesives and transfer tapes from the following illustrative examples. The adhesive bond strengths shown in the examples represent the average of at least three test samples at each test temperature. Unless stated otherwise, the referenced samples were pulled at a speed of about 0.15 inch per minute.

COMPARATIVE EXAMPLE 1

A commercial 9.2 mils thick calendered NOMEX™ tape with a thermoset pressure sensitive adhesive was tested for tensile shear bond strength after pressing against copper and curing the adhesive under pressure for 2.0 hours at 150° C. (although 1.0 hour at 150° C. was believed to be sufficient). The average tensile shear bond strength was 126 psi at room temperature, 36 psi at 80° C., 32 psi at 100° C., 24 psi at 130° C., 21 psi at 150° C. and 6 psi at 160° C. In all cases, the bond failures could be attributed to the adhesive, which resulted in the calendered NOMEX™ tape being pulled away from the copper.

COMPARATIVE EXAMPLE 2

Woven glass sheet material impregnated with an epoxy resin, 0.010 inch thick, having a thermoset epoxy resin adhesive coating did not exhibit any surface tack at ambient temperatures. The sheet was pressed against copper and cured 10 hours in a 90° C. heated press at 50 psi. The tensile shear bond strength of the adhesive was only 34 psi at 160° C. When the cure conditions were changed to 10 hours at 130° C. and 50 psi, the tensile shear bond strength increased to only 67 psi. The bond failures were attributable to the adhesive in both cases.

EXAMPLE 3

Adhesives containing 30-70% solids suitable for coating insulating woven glass sheet materials, calendered aramid papers and dielectric films were made from 100.0 part-by-weight of a liquid bisphenol A—diglycidyl ether epoxy resin, 8.3 to 83.3 parts-by-weight of a 30% solids solution of a high molecular weight polyether copolymer of bisphenol A and epichlorohydrin in methyl ethyl ketone/propylene glycol monomethyl ether 75:25. 0.05 to 0.25 parts-by-weight Sudan Red BBA dye was dissolved in the solution to color it red, and additional methyl ethyl ketone was used to adjust the solids content. Micropulverized dicyandiamide (3.0 to 12.0 parts-by-weight), powdered 3-phenyl-1,1-dimethylurea (0.5 to 5.0 parts-by-weight) and submicron pyrogenic silica (3.0 to 15.0 parts-by-weight) were dispersed in the solution with high shear mixing.

EXAMPLE 4

Calendered NOMEX™ aramid paper, 0.010 inch thick, was coated with an adhesive of Example 3 and the solvents were flashed off in a vertical heated tower. The adhesive coating remaining on the calendered NOMEX™ aramid paper was 0.35 ounces per square yard. A silicone coated paper release liner was pressed against the adhesive side of the NOMEX™ aramid paper and the roll was slit to the width needed to insulate copper turns. When the release liner was peeled off, the pressure sensitive adhesive exhibited excellent adhesion to the turn copper at room temperature. When tested for tensile shear adhesive strength by bonding to copper and curing 2.5 hours at 90° C. and 50 psi, the bond strength exceeded 138 psi at 160° C. (the aramid paper tore without adhesive failure). Similar results of the NOMEX™ aramid paper tearing without adhesive failure at 135 140 psi at 160° C. occurred when the samples were cured 2.5 hours at 110° C. and 50 psi; and 2.5 hours at 130° C. and 50 psi. The tape retained its high bond strength at 160° C. even when the cure time at 130° C. was reduced to 60 minutes.

COMPARATIVE EXAMPLE 5

A woven glass cloth sheet material impregnated with a polyester resin, 0.013 inch thick, was coated with a thermoset epoxy resin having a boron trifluoride-amine hardener. Because the epoxy adhesive had virtually no tack, an industrial grade 0.002-inch thick adhesive transfer tape was used to hold the glass cloth sheet material to the copper. When cured for 10 hours at 130° C. and 50 psi, the tensile shear bond strength at 160° C. was only 27 psi. The adhesive failed without tearing of the glass cloth sheet material.

EXAMPLE 6

The same woven glass cloth sheet material used in Example 5 was coated with an adhesive of Example 3 at a coating weight of 0.35 ounces per square yard. No transfer tape was needed to bond to copper at room temperature because the adhesive on the sheet material was pressure sensitive. The sheet material was pressed against copper and cured 10 hours 110° C. and 50 psi. When tested for tensile shear strength at 160° C., the bond strength exceeded 285 psi when the glass cloth sheet material tore. The adhesive bond strength exceeded that of the tensile breaking strength of the woven glass sheet material.

EXAMPLE 7

Dielectric films polyethylene terephthalate (PET polyester), polyethylene naphthalate (PEN polyester), polyimide films such as KAPTON™, polyphenylene sulfide (PPS), and polyetherimide (PEI) were coated with an adhesive of Example 3. The adhesive coating weight was 0.35 ounces per square yard of film. A silicone coated paper release liner was used to allow making slit rolls of the material. The films bonded to copper, other metals and non metallic material at room temperature because of the pressure sensitive property of the adhesive. The adhesive cured at 90 to 110° C. to form adhesive bonds with tensile shear strengths that exceeded the tensile breaking strength of the films at room temperature up to at least 160° C.

COMPARATIVE EXAMPLE 8

An insulating woven glass cloth sheet material, 0.013 inch thick, was bonded to copper using an industrial-grade acrylic based transfer adhesive tape. The adhesive was 0.002 inch thick. When cured at 130° C. for 5 or 10 hours, the adhesive tensile shear strength was less than 90 psi at room temperature, 21 psi at 100° C. and 14 psi at 150° C. The failures were attributed to the adhesive where the sheet material was pulled off intact with no tearing of the glass cloth sheet material.

EXAMPLE 9

Adhesives containing 30-70% solids suitable for manufacturing adhesive transfer tapes were made from 100.0 part-by-weight of a liquid bisphenol A—diglycidyl ether epoxy resin, 8.3 to 83.3 parts-by-weight of a 30% solids solution of a high molecular weight polyether copolymer of bisphenol A and epichlorohydrin in methyl ethyl ketone/propylene glycol monomethyl ether 75:25. 0.05 to 0.25 parts-by-weight Sudan Red BBA dye was dissolved in the solution to color it red. Additional methyl ethyl ketone was used to adjust the solids content. Micropulverized dicyandiamide (3.0 to 12.0 parts-by-weight), powdered 3-phenyl- 1,1-dimethylurea (0.5 to 5.0 parts-by-weight) and submicron pyrogenic silica (3.0 to 15.0 parts-by-weight) were dispersed in the solution with high shear mixing.

EXAMPLE 10

An adhesive transfer tape was manufactured from 0.0012 inch thick non woven polyester mat (DACRON™) that was coated with the adhesive of Example 2. The adhesive easily wetted the polyester mat fabric. A release liner made from bleached kraft paper with a silicone release coating on both sides was wedded to the polyester mat carrying the adhesive. A single release liner was used. The material was slit to 0.5 and 1.0 inch wide adhesive transfer tape.

EXAMPLE 11

The transfer adhesive tape of Example 3 was used to bond insulating woven glass cloth sheet material, 0.013 inch thick, to copper. The insulating sheet material was the same as the one used in Example 1. When cured 5.0 hours at 110° C., the tensile shear strength exceeded 525 psi at room temperature, 335 psi at 100° C., and 270 psi at 150° C. and 160° C. The glass cloth sheet material tore in all cases. The adhesive bond strength exceeded the tensile breaking strength of the sheet material.

EXAMPLE 12

Calendered NOMEX™ aramid paper, 0.010 inch thick, was bonded to copper using the adhesive transfer tape of Example 3. The samples were cured for 5.0 hours at 110° C. The tensile shear strength exceeded 150 psi at room temperature to 130° C. and exceeded 125 psi at 150° C. and 160° C. The aramid paper tore in all cases with no adhesive failures. The adhesive bond strength also exceeded the tensile breaking strength of the calendered aramid paper at room temperature to at least 160° C.

EXAMPLE 13

Dielectric films polyethylene terephthalate (PET polyester), polyethylene naphthalate (PEN polyester), polyimide films such as KAPTON™, polyphenylene sulfide (PPS), and polyetherimide (PEI) were bonded to copper using the adhesive transfer tape of Example 3. The adhesive cured at 90 to 110° C. to form adhesive bonds with tensile shear strengths that exceeded the tensile breaking strength of the films at room temperature to at least 160° C.

COMPARATIVE EXAMPLE 14

An industrial grade acrylic transfer tape was used to bond copper to copper. The tensile strength values were less than 100 psi at room temperature and decreased to less than 25 psi at 100° C. and 160° C. Baking 5.0 or 10.0 hours at 130° C. did not improve the bond strength.

EXAMPLE 15

The transfer adhesive tape of Example 3 was used to bond copper to copper. The samples were cured 10.0 hours at 90° C. by pressing at 50 psi in a heated press. The tensile shear strengths of the adhesive bond were 2,080 psi at room temperature, 2,510 psi at 80° C., 2,530 psi at 130° C. and 795 psi at 160° C.

While many of the above examples of this invention used a liquid bisphenol A—diglycidyl ether epoxy resin and 3-phenyl-1,1-dimethylurea as the accelerator, other epoxy resins or blends of two or more epoxy resins may used and other substituted urea compounds may be used as the accelerator for the dicyandiamide catalyst.

Although the present invention has been described in terms of a preferred embodiment, it is apparent that other forms could be adopted by one skilled in the art. Therefore, while the present invention was described in terms of insulating copper turns of a generator rotor, the adhesives can also be used as a contact adhesive for bonding other metallic and non-metallic materials laminations, specialty tapes, and bonding composite materials where high adhesive bond strengths are needed at elevated temperatures.

What is claimed is:

1. A one part, heat curable pressure sensitive adhesive composition for bonding metallic and non metallic materials, said adhesive composition forming a tacky liquid at ambient temperature and comprising an epoxy resin having an epoxide functionality of at least 2.0, a tackifier agent comprising at least 2.5 parts by weight to about 25 parts by weight of a high molecular weight linear polyether copolymer of epichlorohydrin and bisphenol A for every 100 parts of said epoxy resin, micropulverized dicyandiamide and an accelerator.

2. The adhesive composition according to claim 1 further comprising inorganic fillers comprising submicron pyrogenic silica in an amount sufficient to control the flow properties of said liquid adhesive composition at ambient temperature.

3. The adhesive composition according to claim 1 further comprising colorants.

4. The adhesive composition according to claim 1, wherein said liquid epoxy resin comprises a bisphenol F—diglycidyl ether epoxy resin.

5. The adhesive composition according to claim 1, wherein said liquid epoxy resin comprises an epoxy novolac having a 2.2 epoxide functionality.

6. The adhesive composition according to claim 1, further comprising a blend of two or more liquid epoxy resins wherein each of said liquid epoxy resins are diluted with reactive diluents and have an epoxide functionality of at least 1.0.

7. The adhesive composition according to claim 1, further comprising a high molecular weight linear polyether copolymer of bisphenol A and epichlorohydrin.

8. The adhesive composition according to claim 1, wherein said curing agent for the epoxy resin is a dicyandiamide.

9. The adhesive composition according to claim 8, wherein said dicyandiamide comprises micropulverized dicyandiamide and an anticaking agent.

10. The adhesive composition according to claim 1, wherein said accelerator compound is selected from the group consisting of 3 phenyl 1,1 dimethylurea, 3 (4 chlorophenyl) 1,1 dimethylurea, 3 (3,4 dichlorophenyl), 1,1 dimethylurea,3 (3 chloro 4 methylphenyl) 1,1 dimethylurea.

11. The adhesive composition according to claim 1, wherein said accelerator compound is selected from the group consisting of imidazoles, amines and complexes of amines or imidazoles with acidic compounds.

12. An adhesive transfer tape comprising a woven or non woven fabric carrier and a one part, heat curable pressure sensitive adhesive composition applied to said fabric carrier, said adhesive composition forming a tacky liquid at ambient temperature and comprising an epoxy resin having an epoxide functionality of at least 2.0, a tackifier agent comprising at least 2.5 parts by weight to about 25 parts by weight of a high molecular weight linear polyether copolymer of epichlorohydrin and bisphenol A for every 100 parts of said epoxy resin, micropulverized dicyandiamide and an accelerator.

13. An adhesive transfer tape according to claim 12, wherein said adhesive composition is applied to only one side of said fabric carrier.

14. An adhesive transfer tape according to claim 12, wherein said adhesive composition is applied to both sides of said fabric carrier.

15. An adhesive transfer tape according to claim 12, wherein said fabric carrier comprises film, sheet material or calendered aramid paper.

16. An adhesive transfer tape according to claim 12, wherein said adhesive composition cures to a thermoset solid when heated to 90° C. or above.

17. A heat curable pressure sensitive adhesive composition for bonding copper coil turns in electrical generators to non-metallic insulating materials, said adhesive composition forming a tacky liquid at ambient temperature and comprising an epoxy resin having an epoxide functionality of at least 2.0, a tackifier agent comprising at least 2.5 parts by weight to about 25 parts by weight of a high molecular weight linear polyether copolymer of epichlorohydrin and bisphenol A for every 100 parts of said epoxy resin, micropulverized dicyandiamide, an accelerator compound and inorganic fillers.

18. The adhesive composition according to claim 17, further comprising a blend of two or more liquid epoxy resins wherein each of said liquid epoxy resins are diluted with reactive diluents and have an epoxide functionality of at least 1.0.

19. The adhesive composition according to claim 17, further comprising inorganic fillers comprising submicron pyrogenic silica in an amount sufficient to control the flow properties of said liquid adhesive composition at ambient temperature.

* * * * *